United States Patent [19]

Wada et al.

[11] Patent Number: 4,984,180
[45] Date of Patent: Jan. 8, 1991

[54] METHOD FOR COMPUTER AIDED GENERATOR OF DESIGN REFERENCE AND APPARATUS THEREFOR

[75] Inventors: Yutaka Wada, Hitachi; Yasuhiro Kobayashi, Katsuta; Toru Mitsuta, Hitachi, all of Japan

[73] Assignee: Hitachi, Ltd., Tokyo, Japan

[21] Appl. No.: 440,442

[22] Filed: Nov. 22, 1989

Related U.S. Application Data

[63] Continuation of Ser. No. 916,728, Oct. 8, 1986, abandoned.

[30] Foreign Application Priority Data

Oct. 9, 1985 [JP] Japan ................... 60-223570

[51] Int. Cl.⁵ ............................................. G06F 15/60
[52] U.S. Cl. ........................... 364/518; 364/474.24
[58] Field of Search ............ 364/521, 512, 188–190, 364/474.24, 474.25, 488

[56] References Cited

U.S. PATENT DOCUMENTS

| | | | |
|---|---|---|---|
| 3,927,948 | 12/1975 | Cox et al. | 364/512 X |
| 4,275,449 | 6/1981 | Aish | 364/512 |
| 4,451,895 | 5/1984 | Sliwkowski | 364/188 X |
| 4,586,145 | 4/1986 | Bracewell et al. | 364/512 |
| 4,604,718 | 8/1986 | Norman et al. | 364/188 X |
| 4,656,603 | 4/1987 | Dunn | 364/521 X |
| 4,700,317 | 10/1987 | Watanabe et al. | 364/521 X |
| 4,788,636 | 11/1988 | Shiratori et al. | 364/474.25 X |
| 4,813,013 | 3/1989 | Dunn | 364/488 X |

OTHER PUBLICATIONS

Computer-Aided Design, vol. 14, No. 4, Jul. 1982, pp. 209–214.
IEEE Compint 85, pp. 96–102.

Primary Examiner—Gary V. Harkcom
Assistant Examiner—Mark K. Zimmerman
Attorney, Agent, or Firm—Antonelli, Terry, Stout & Kraus

[57] ABSTRACT

Graphic data of design objects designated by an input device are retrieved from a design object data memory and displayed on a display device. A restrictive item applied to the design object displayed on the display device and redesignated by the input device is read from the design object data memory. Specification data of the designated design objects are also read from the design object data memory. A condition part of the design reference is made based on the redesignated design object and the selected specification data, and an end portion of the design reference is made based on the redesignated design object, the selected restrictive item and a reference value entered by the input device. The design reference including the condition part and the end portion is displayed on the display device and stored into a design reference memory.

18 Claims, 24 Drawing Sheets

FIG. 2

| POSITION COORDINATE / DESIGN OBJECT | X1 min | X1 max | Y1 min | Y1 max |
|---|---|---|---|---|
| WL001 | 1000 | 5000 | 10000 | 11500 |
| WL002 | 6000 | 10000 | 10000 | 11500 |
| CL001 | 5000 | 6000 | 10000 | 11500 |
| CL002 | 0 | 1000 | 10000 | 11500 |
| HD001-01 | 5000 | 10000 | 7000 | 8000 |
| HD001-01 | 0 | 2000 | 7500 | 8500 |

FIG. 3

| POSITION COORDINATE / MENU ITEM | X1 min | X1 max | Y2 min | Y2 max |
|---|---|---|---|---|
| UPDATE | 0 | 50 | 0 | 50 |
| RETURN | 100 | 150 | 0 | 50 |
| MENU $A_1$ | 200 | 300 | 0 | 50 |
| MENU $A_2$ | 350 | 450 | 0 | 50 |
| MENU $A_3$ | 500 | 600 | 0 | 50 |
| MENU $A_4$ | 650 | 750 | 0 | 50 |

FIG. 4

| MENU<br>PAGE | MENU $A_1$ | MENU $A_2$ | MENU $A_3$ | MENU $A_4$ |
|---|---|---|---|---|
| 1 | MINIMUM SPACING | MAXIMUM STRAIGHT LINE LENGTH | MINIMUM STRAIGHT LINE LENGTH | INHIBIT TO SET |
| 2 | SET CLOSELY | SET DISTANTLY | SET UPWARD | SET DOWNWARD |
| 3 | =REFERENCE VALUE | >REFERENCE VALUE | <REFERENCE VALUE | |
| 4 | | | | |

FIG. 5

| SPECIFICATION ITEM | SPECIFICATION VALUE |
|---|---|
| CODE | WL001 |
| NAME | WALL |
| TYPE | SHIELDING WALL |

FIG. 6

| SPECIFICATION ITEM | SPECIFICATION VALUE |
|---|---|
| CODE | HD001-01 |
| NAME | PIPING |
| SYSTEM | HEATER DRAIN |
| DIAMETER | 850 mm |
| FLUID | VAPOR |
| TEMPERATURE | 150 °C |

FIG. 7

| COORDINATE | | X3min | X3max | Y3min | Y3max |
|---|---|---|---|---|---|
| MENU | B₁ | 0 | 50 | 250 | 300 |
| | B₂ | 0 | 50 | 200 | 250 |
| | B₃ | 0 | 50 | 150 | 200 |
| | B₄ | 0 | 50 | 100 | 150 |
| | B₅ | 0 | 50 | 50 | 100 |
| | B₆ | 0 | 50 | 0 | 50 |
| SPEC. ITEM | 1 | 50 | 150 | 250 | 300 |
| | 2 | 50 | 150 | 200 | 250 |
| | 3 | 50 | 150 | 150 | 200 |
| | 4 | 50 | 150 | 100 | 150 |
| | 5 | 50 | 150 | 50 | 100 |
| | 6 | 50 | 150 | 0 | 50 |
| SPEC. VALUE | 1 | 150 | 200 | 250 | 300 |
| | 2 | 150 | 200 | 200 | 250 |
| | 3 | 150 | 200 | 150 | 200 |
| | 4 | 150 | 200 | 100 | 150 |
| | 5 | 150 | 200 | 50 | 100 |
| | 6 | 150 | 200 | 0 | 50 |

FIG. 18

| MENU ITEM | | SPECIFICATION ITEM | SPECIFICATION VALUE |
|---|---|---|---|
| MENU | B1 | CODE | HD-001-1 |
| | B2 | NAME | PIPING |
| | B3 | SYSTEM | HEATER DRAIN |
| | B4 | DIAMETER | 850mm |
| | B5 | FLUID | VAPOR |
| | B6 | TEMPERATURE | 150 °C |

FIG. 21

| ITEM | ID | DESIGN REFERENCE | | OBJECT-1 | | |
|---|---|---|---|---|---|---|
| VALUE | I | MINIMUM SPACING | | | | |
| | | | | | | |
| | | | | ITEM | OBJECT-2 | |
| | | | | VALUE | | |
| | | | | ITEM | CODE 1 | CODE 2 | REF. VALUE |
| | | | | VALUE | | | |

| ITEM | ID | DESIGN REFERENCE | | OBJECT-1 | SYSTEM | |
|---|---|---|---|---|---|---|
| VALUE | I | MINIMUM SPACING | | PIPING | HEATER DRAIN | |
| | | | | | | |
| | | | | ITEM | OBJECT-2 | |
| | | | | VALUE | | |
| | | | | ITEM | CODE 1 | CODE 2 | REF. VALUE |
| | | | | VALUE | | | |

| ITEM  | ID | DESIGN REFERENCE |   | OBJECT-1 | SYSTEM      | DIAMETER     |
|-------|----|------------------|---|----------|-------------|--------------|
| VALUE | I  | MINIMUM SPACING  |   | PIPING   | HEATER DRAIN| > REF. VALUE |
|       |    |                  |   |          |             | 800          |

| ITEM  | OBJECT-2 |
|-------|----------|
| VALUE |          |

| ITEM  | CODE 1 | CODE 2 | REF. VALUE |
|-------|--------|--------|------------|
| VALUE | PIPING |        |            |

FIG. 24

| ITEM  | ID | DESIGN REFERENCE |   | OBJECT-1 | SYSTEM       | DIAMETER     |
|-------|----|------------------|---|----------|--------------|--------------|
| VALUE | I  | MINIMUM SPACING  |   | PIPING   | HEATER DRAIN | > REF. VALUE |
|       |    |                  |   |          |              | 800          |

| ITEM  | OBJECT-2 | TYPE           |
|-------|----------|----------------|
| VALUE | WALL     | SHIELDING WALL |

| ITEM  | CODE 1 | CODE 2 | REF. VALUE |
|-------|--------|--------|------------|
| VALUE | PIPING | WALL   |            |

FIG. 25

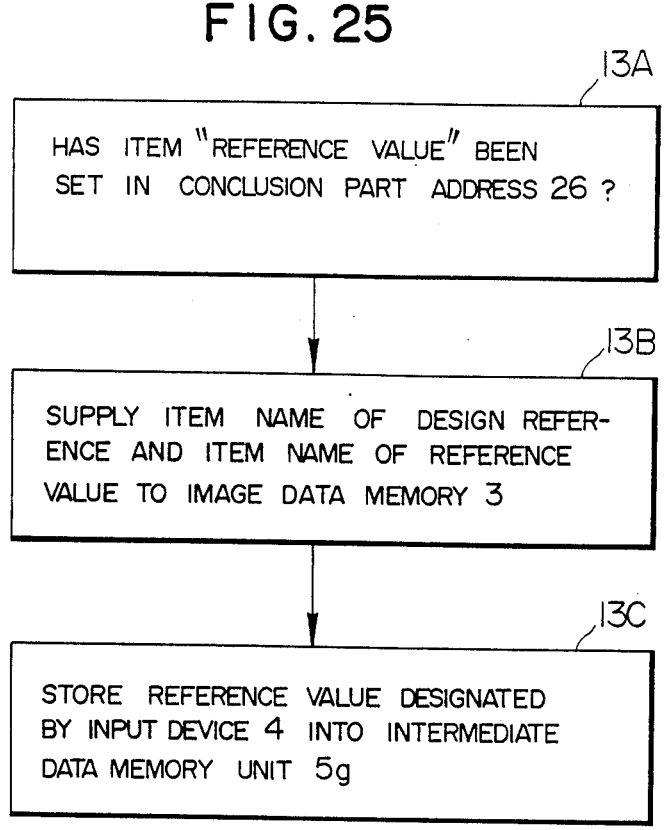

```
                                              13A
┌─────────────────────────────────────┐
│ HAS ITEM "REFERENCE VALUE" BEEN     │
│ SET IN CONCLUSION PART ADDRESS 26 ? │
└─────────────────────────────────────┘
                  │
                  ▼                           13B
┌─────────────────────────────────────┐
│ SUPPLY ITEM NAME OF DESIGN REFER-   │
│ ENCE AND ITEM NAME OF REFERENCE     │
│ VALUE TO IMAGE DATA MEMORY 3        │
└─────────────────────────────────────┘
                  │
                  ▼                           13C
┌─────────────────────────────────────┐
│ STORE REFERENCE VALUE DESIGNATED    │
│ BY INPUT DEVICE 4 INTO INTERMEDIATE │
│ DATA MEMORY UNIT 5g                 │
└─────────────────────────────────────┘
```

FIG. 26

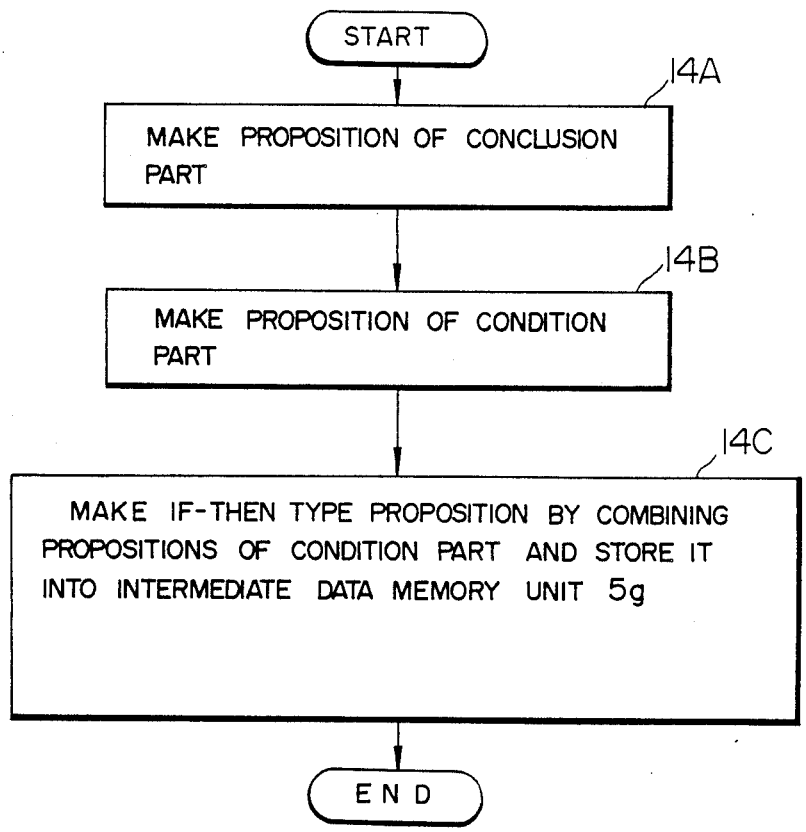

```
AND
    (PIPING < CODE 1 >)
    (SYSTEM < CODE 1 > .HEATER DRAIN)
    (DIAMETER < CODE1 >.< VARIABLE >)
    (>REFERANCE VALUE< VARIABLE >800)
    (WALL< CODE 2 >)
    (TYPE< CODE 2 > SHIELDING WALL)
THEN
    (MINIMUM SPACING (<CODE1>< CODE2 >)1000)
```

"METHOD FOR COMPUTER AIDED GENERATOR OF DESIGN REFERENCE AND APPARATUS THEREFOR

This application is a continuation of application Ser. No. 916,728, filed Oct. 8, 1986, now abandoned.

CROSS REFERENCE TO RELATED APPLICATION

Reference is made to co-pending U.S. application Ser. No. 838,957, filed Mar. 12, 1986, entitled "Design Support Method and Apparatus Therefor", now U.S. Pat. No. 4,789,944.

BACKGROUND OF THE INVENTION

The present invention relates to a method for making a design reference or rule and an apparatus therefor, and more particularly to such a method used by a designer who establishes a design reference or rule by selecting an object in an existing design drawing, selecting and combining specifications thereof and establishing a condition of design references.

A conventional computer-aided design apparatus (hereinafter CAD apparatus) comprises a display for displaying a design object and an input device for generating coordinate data based on the pointing to a position on the display screen, and interactively processes by displaying point, line or characters at the position pointed to by the designer and storing the coordinate of that position and the displayed data into a memory. Such CAD apparatus is described in JP-A-59-45575 and U.S. Pat. No. 4,451,895. In another known interactive CAD apparatus, when design parameters such as position, shape and dimension of the design object are entered, they are composed with reference values of design parameters derived from design references or rules so that the design proceeds while the validity of the input value is checked. In this CAD apparatus, it is necessary to previously store the design references in the memory A portion of the design references accumulated and utilized in the particular technical fields, such as design references on layout design of plant piping are published in a "Piping Handbook, by Reno C. King et al., McGraw-Hill 1981. It teaches that when a design expert determines a design reference or rule, it is effective to refer to an existing design drawing and quote, indicate or describe items on position and specification of the design object. In order to implement this method in the CAD apparatus, it is necessary to allow interactive reference of the data of the design object in the design drawing for use as data for making the design references. In a CAD apparatus disclosed in JP-A-59-220867 and JP-A-59-66763, when part of a machine design drawing displayed on a display screen is selected, a part of the data base is searched and data such as a part specification and dimension are registered in a list in the data base, and it may be displayed on the display screen or used to make a more detailed manufacturing design drawing. By utilizing the CAD apparatus disclosed in those A-PA's, the part data for checking the design references can be rapidly retrieved while the designer watches the design drawing. However, since the designer cannot directly input to the design reference making process, the designer needs to input the design references by a separate device to store them in the data base.

SUMMARY OF THE INVENTION

It is an object of the present invention to provide a method for making a design reference or rule and an apparatus therefor for providing a high precision design reference in a short time.

In accordance with the present invention, graphics of a plurality of designated design objects are displayed on a display device, one or more of the design objects displayed on the display device is selected, a restrictive item applied to the selected design object is read from a memory, a reference value to the restrictive item is established, and a design reference is made based on the selected design object, the restrictive item and the reference value.

BRIEF DESCRIPTION OF THE DRAWINGS

FIG. 2 shows a data storage format for a design object, FIG. 3 shows a data storage format for a menu item coordinate, FIG. 4 shows a data storage format for a menu item, FIG. 5 shows a data storage format for a specification item of a design object, FIG. 6 shows a data storage format for another specification item of the design object, FIG. 7 shows a data storage format for menu item, specification item and specification value by the present apparatus, FIG. 18 shows a data storage format for a menu item by the apparatus shown in FIG. 1, FIG. 21 shows a content of an intermediate data memory before the step 12, FIGS. 22 to 24 show contents of the intermediate data memory which vary as the process of the step 12 proceeds, FIG. 25 shows a detailed process of a step 13 of FIG. 8, FIG. 26 shows a content of the intermediate data memory after the step 13, FIG. 27 shows a detailed process of a step 14 of FIG. 8.

Figure 1:
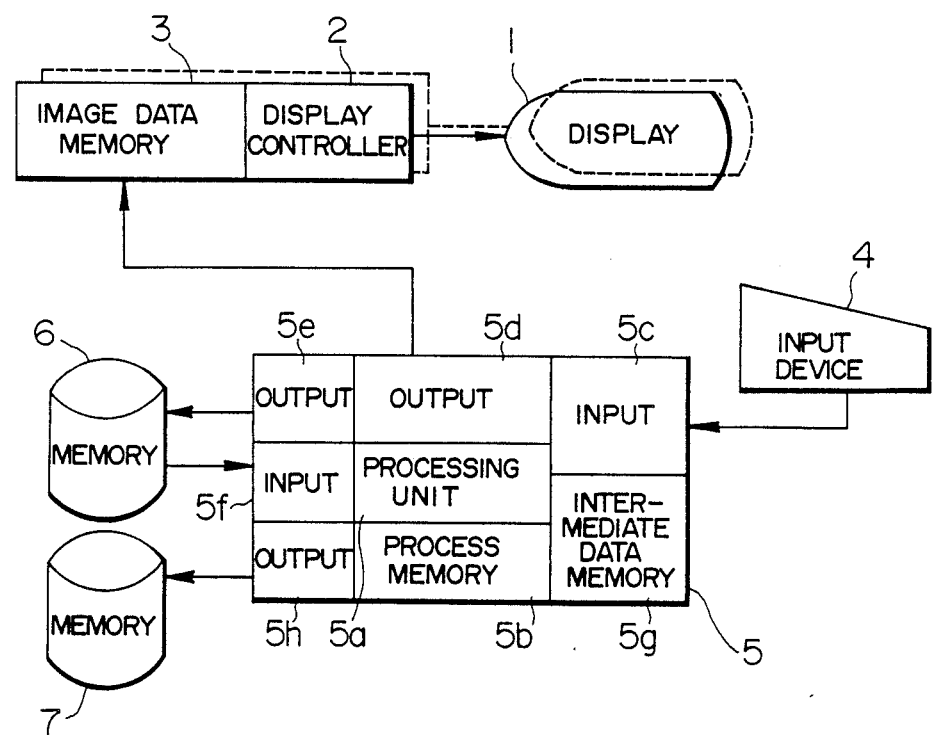
FIG. 1 shows a configuration of one embodiment of a design reference making apparatus of the present invention.

DESCRIPTION OF THE PREFERRED EMBODIMENTS FIG.

1. shows a configuration of an embodiment of the design reference making apparatus of the present invention. A processor 5 includes a processing unit 5a, a process memory unit 5b, an input unit 5c, and image data out put unit 5d, a design object data retrieval code output unit 5e, a design object data input unit 5f, an intermediate date memory unit 5g and a design reference output unit 5h. The processing unit 5a sequentially reads the processing procedures stored in the process memory unit 5b to carry out the processing in accordance with the processing procedures. An image data memory 3 stores coordinate data of a design object which is the image data supplied from the processor 5 and coordinate data of a menu area. An image display controller 2 reads the coordinate memory 3 to display characters or an image on a dislay device 1. A design object memory 6 stores coordinate date of the design object, coordinate data of the menu area, menu content data, specification data of the design object and coordinate data of a display position. An example of the coordinate data of the design object stored in the design object data memory 6 is shown in FIG. 2. The data of the design object shown in FIG. 2 includes design objects WL001, WL002, CL001, CL002, HD001-01 and HD001-02, and maximum and minimum values of X coordinates and Y coordinate Xmax, Ymax, Xmin, and Ymin. FIG. 3 shows an example of position coordinate data of the menu items stored in the design object data memory 6. FIG. 4 shows an example of menu content data of menus $A_1$-$A_4$ of the menu items stored in the design object data memory 6. The menu items on pages 1 and 2 are restrictive items of a conclusion part of the design reference. FIG 5. shows an example of specification data of the design object WL001 (FIG. 2) stored in the design object data memory 6. FIG. 6 shows an example of specifications of the design object HD001-01 (FIG. 2) stored in the design object data memory 6. FIG. 7 shows an example of display position coordinate data stored in the design object data memory 6.

Figure 8:
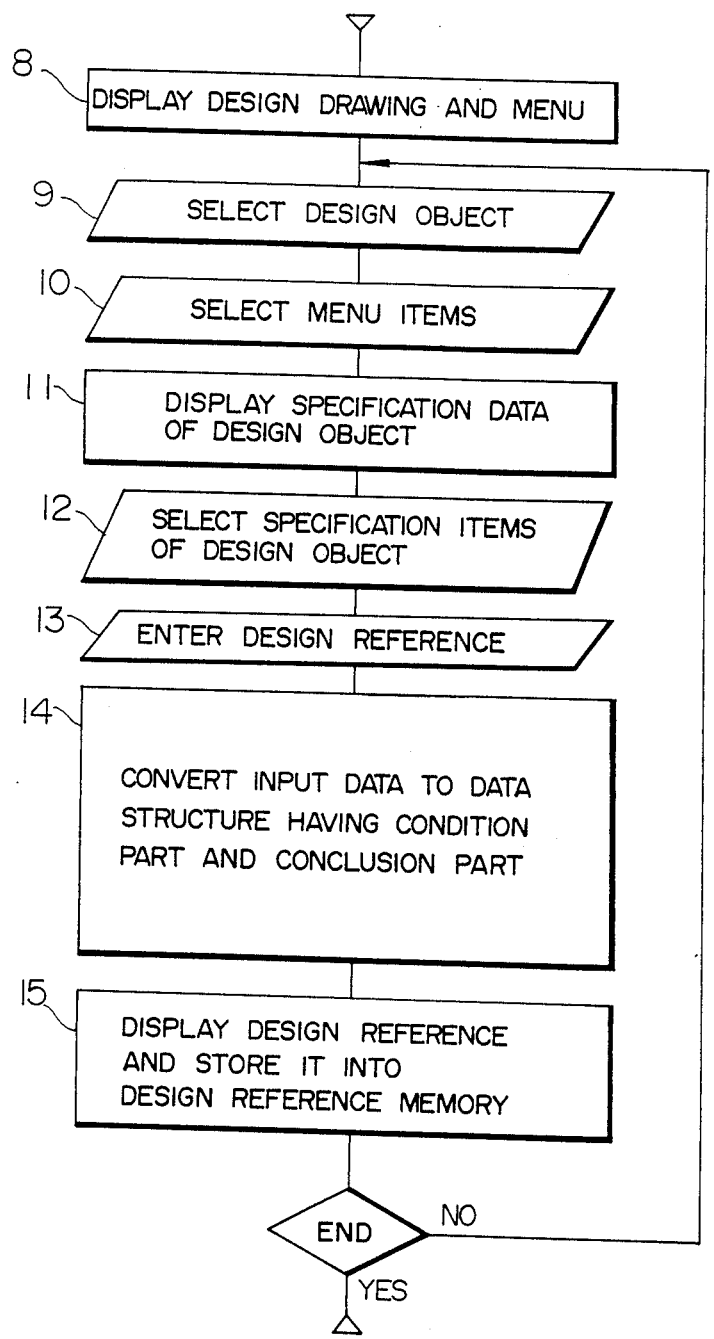
FIG. 8 shows a process flow in the design reference making apparatus shown in FIG. 1.

FIG. 8 shows a flowchart of a processing procedure (computer program) which is stored in the process memory unit 5b and executed by the processing unit 5a. An operation of the design reference making apparatus of the present embodiment is explained with reference to the flowchart.

When an operator powers on the design reference making apparatus and enters a start signal into the processor 5 through an input device such as a keyboard, the computer program is read from the process memory unit 5b to the processing unit 5a. The processing unit 5a performs an operation to determine a design reference or rule consisting of a condition part and a conclusion part in accordance with the computer program of FIG. 8. Details of the processing are explained below.

Figure 9:
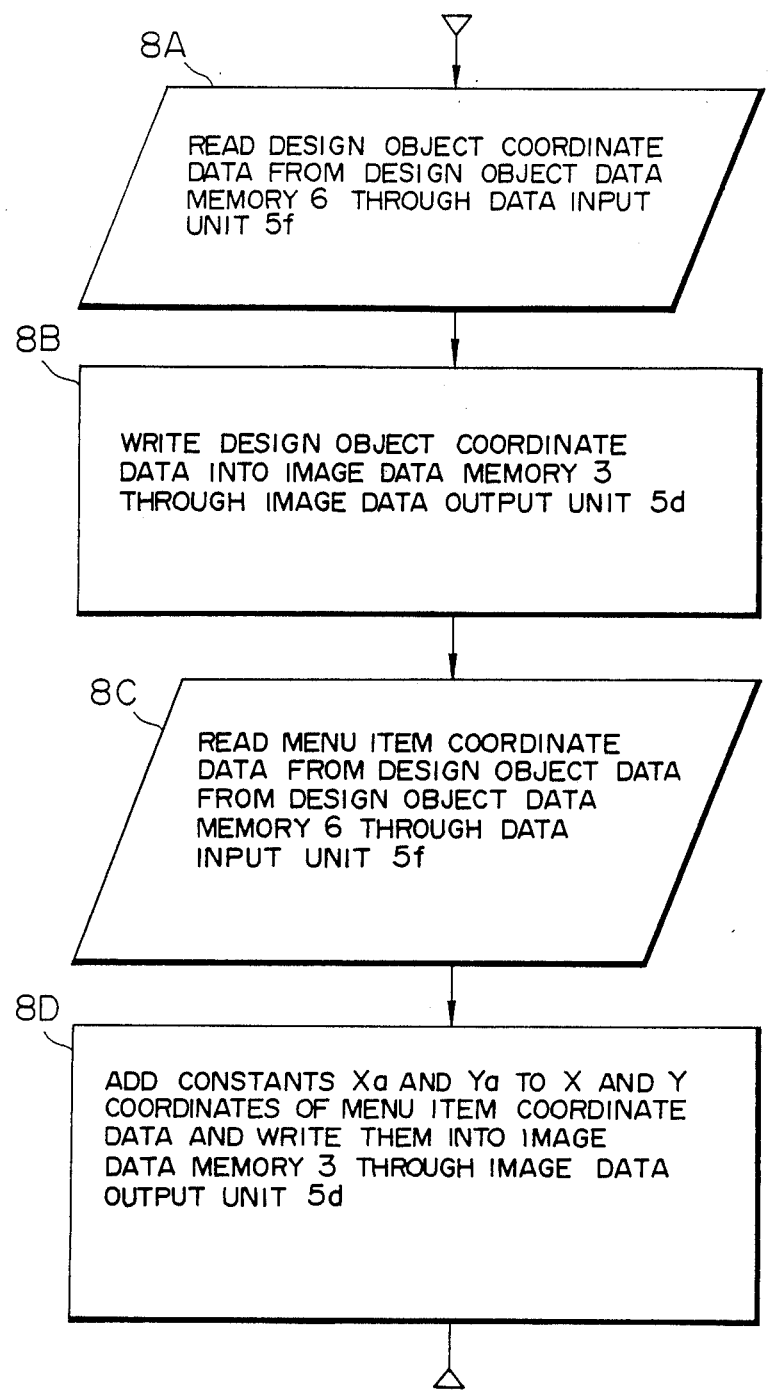
FIG. 9 shows a detailed process of a step 8 shown in FIG. 8.
Figure 10:
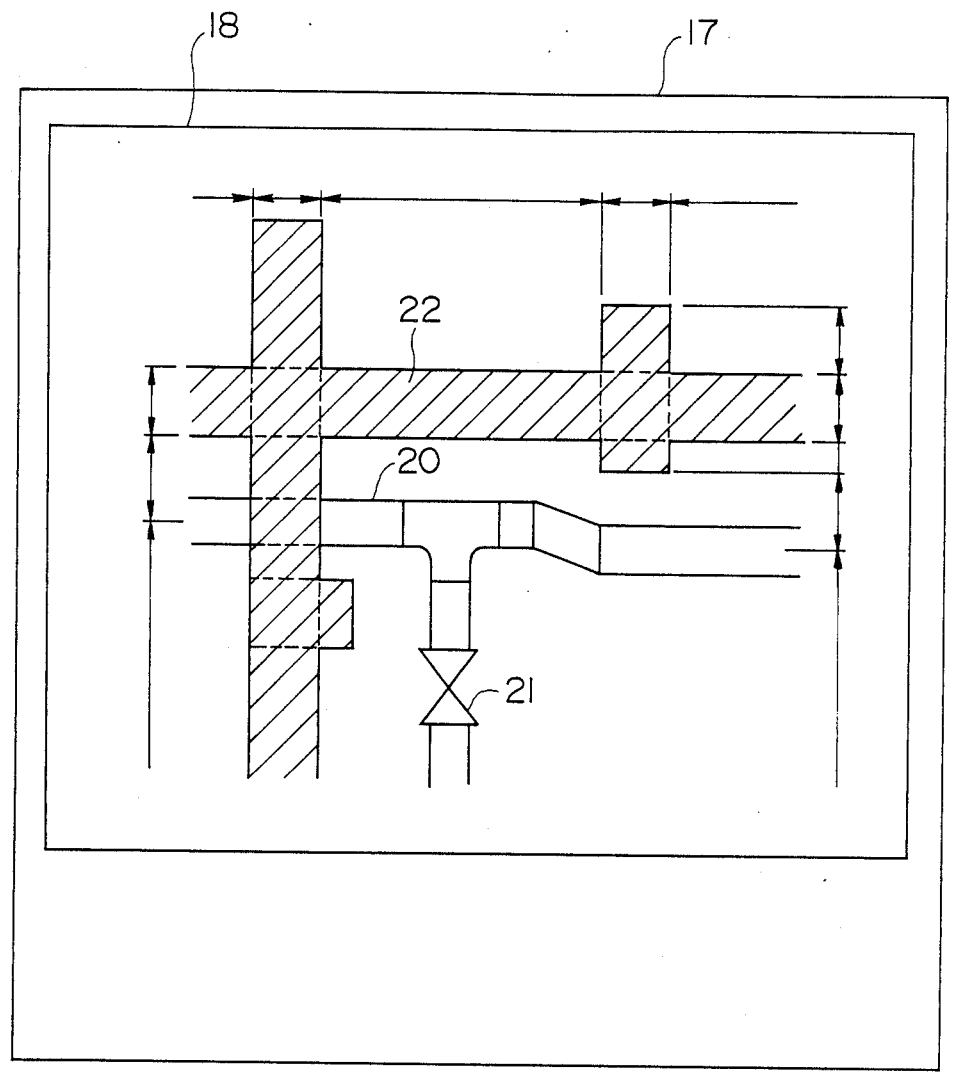
FIG. 10 shows an image of a design object by the design reference making apparatus shown in FIG. 1.

A step 8 of the computer program is first executed. FIG. 9 shows details of the step 8. In a step 8A, a design object name (code) which the operator designates by the input device 4 is sent to the design object data memory 6 through the design object data retrieval code output unit 5e, the coordinate data of the designated design object is selected from the design object data memory 6 (FIG. 2), and the coordinate data is read into the processing unit 5a through the data input unit 5f. The coordinate data of the selected design object is supplied to the image data memory 3 through the image data output unit 5d (step 8B). Then, the image display controller 2 reads in the design object image data stored in the image data memory 3 and displays it on the display device 1. FIG. 10 shows a displayed image 18. Numeral 17 denotes a screen of the display device 1, numeral 20 denotes piping, numeral 21 denotes a valve and numeral 22 denotes a wall. In a step 8C, coordinate data of menu items is selected from the design object data memory 6 and it is read in through the data input unit 5f. The coordinate data of the selected menu items consists of four menu items (menus $A_1$-$A_4$). Detail of the menu items is shown in FIG. 4. In a step 8D, items "minimum spacing", "maximum straight line length", "minimum straight line length" and "inhibit to set" corresponding to the menus $A_1$, $A_2$, $A_3$ and $A_4$ on the page 1 are selected from the data (FIG. 4) stored in the design object data memory 6. Those items as well as the coordinate data of the menu items selected in the step 8C are supplied to the image data memory 3 through the image data output unit 5d. Those data are stored in the image data memory 3. In the step 8D, for the menu items "update" and "return" of the menu items shown in FIG. 3, the characters "update" and "return" are used as displayed contents and they are stored in the image data memory 3.

Figure 11:
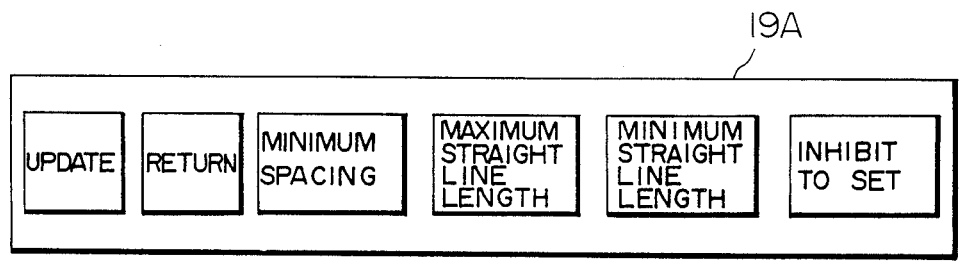
FIG. 11 shows an image of a restrictive item to a menu item by the design reference making apparatus shown in FIG. 1.
Figure 12:
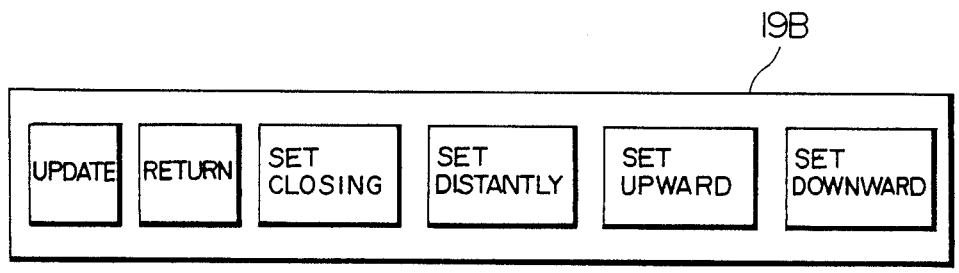
FIG. 12 shows an image of another restrictive item to the menu item by the apparatus shown in FIG. 1.
Figure 13:
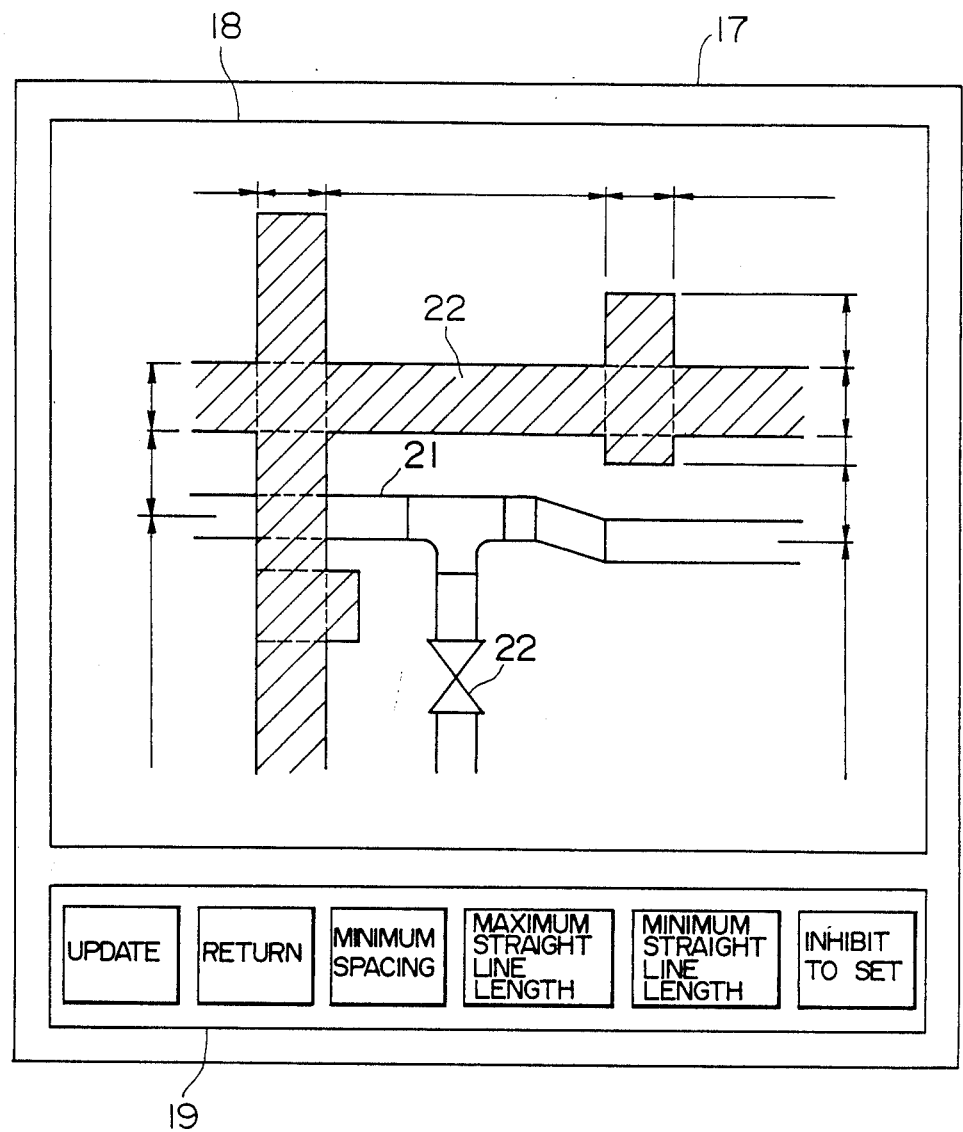
FIG. 13 shows an image of a design object and a restrictive item by the apparatus shown in FIG. 1, FIGS. 14 and 15 show details of a step 9 of FIG. 8.

In the present embodiment, an example of an image 19A of the menu items on the page 1 displayed on the display device 1 after the step 8D is shown in FIG. 11, and an example of an image 19B of the menu items on the page 2 displayed on the display device 1 after the step 8D is shown in FIG. 12. An example of an image displayed on the display device 1 after the completion of the step 8 is shown in FIG. 13. In the present example, the image 18 of the design drawing including the design object and the image 19 of the menu items (image actually displayed is shown by an image 19A in FIG. 11) are simultaneously displayed. An origin point of the image 19 (minimum point on the X axis, minimum point on the Y axis) is shifted from an origin point of the screen 17 by a displacement $X_0$ in the X direction and a displacement $Y_0$ in the Y direction, added to the coordinate data of the selected menu items in the step 8. The menu items are selected from the items shown in FIG. 4 with the designation of a page. The items having the page designated to page 1 in the step 8 may be changed in a process to be described later.

Then, the operator designates a design object in the image 24 displayed on the display device 1 by the input device 4. A step 9 comprises two major procedures (a) reading a coordinate of the designated design object and (b) selecting the design object corresponding to the coordinate from the design object data memory 6.

Figure 14:
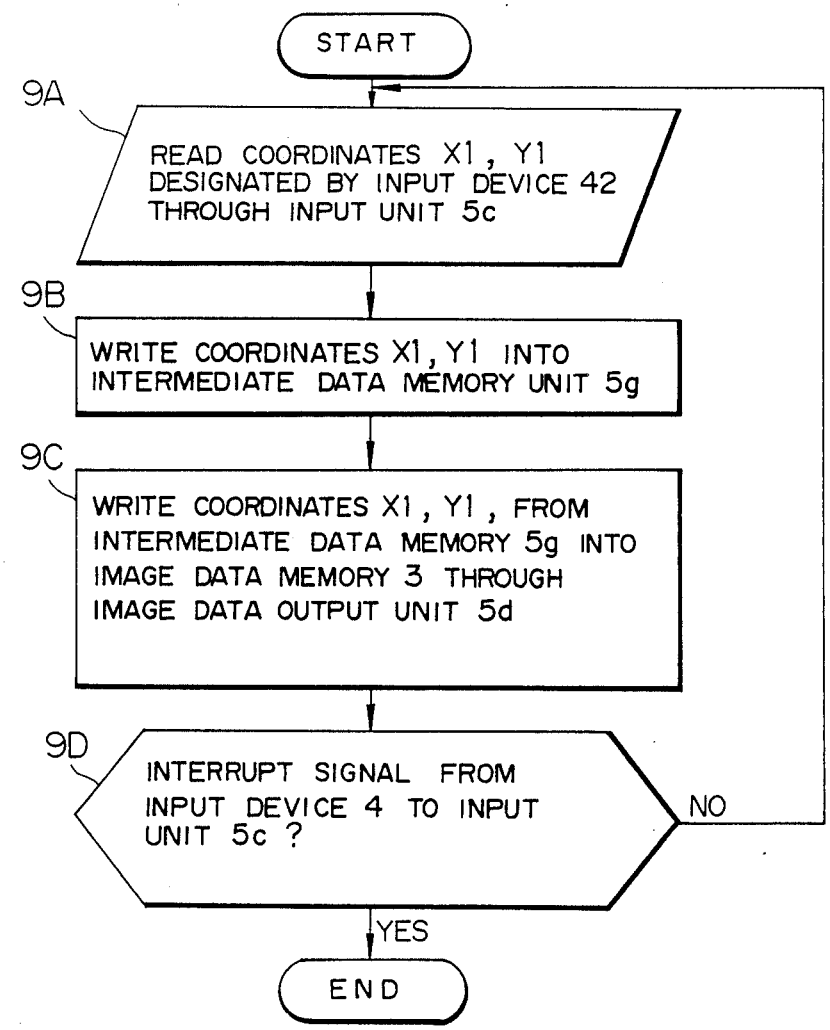

FIG. 14 shows the procedure (a) of the step 9, that is, steps 9A-9D. The steps 9A-9D are executed in accordance with an operator's instruction given through the input device 4. A two dimensional coordinate input device such as a mouse or joy stick may be used. In the input device 4, an encoder for converting a displacement to a coordinate value is coupled to a mechanism which transduces movement of a manipulator into displacements in two orthogonal directions. The input device 4 writes the coordinate and applies an interrupt signal to the processor 5 through the input unit 5c.

The coordinates ($X_1$, $Y_1$) of the design object in the image 18 which the operator designated by the input device 4 are read through the input unit 5c (step 9A). The coordinates $X_1$, $Y_1$ are stored in the intermediate data memory unit 5g (step 9B). Then, the coordinates $X_1$, $Y_1$ are read from the intermediate data memory unit 5g and supplied to the image data memory 3 through the image data output unit 5d (step 9C). The coordinates $X_1$, $Y_1$ are stored in the image data memory 3 and displayed on the display device 1. Finally, whether the interrupt signal has been sent from the input device 4 through the input unit 5c or not is checked (step 9D). If it has been sent, the procedure (b) of the step 9 is executed If it has not been sent, the steps 9A-9D are repeated. Thus, until the interrupt signal is applied to the processor 5 by the input device 4 through the input unit 5c, the point corresponding to the coordinate designated by the input device 4 is displayed on the screen 17 of the display device 1. This is done by reading the coordinates X and Y stored in the image data memory unit 5d by the image display controller 2 and displaying the designated point on the screen of the display device 1.

Figure 15:
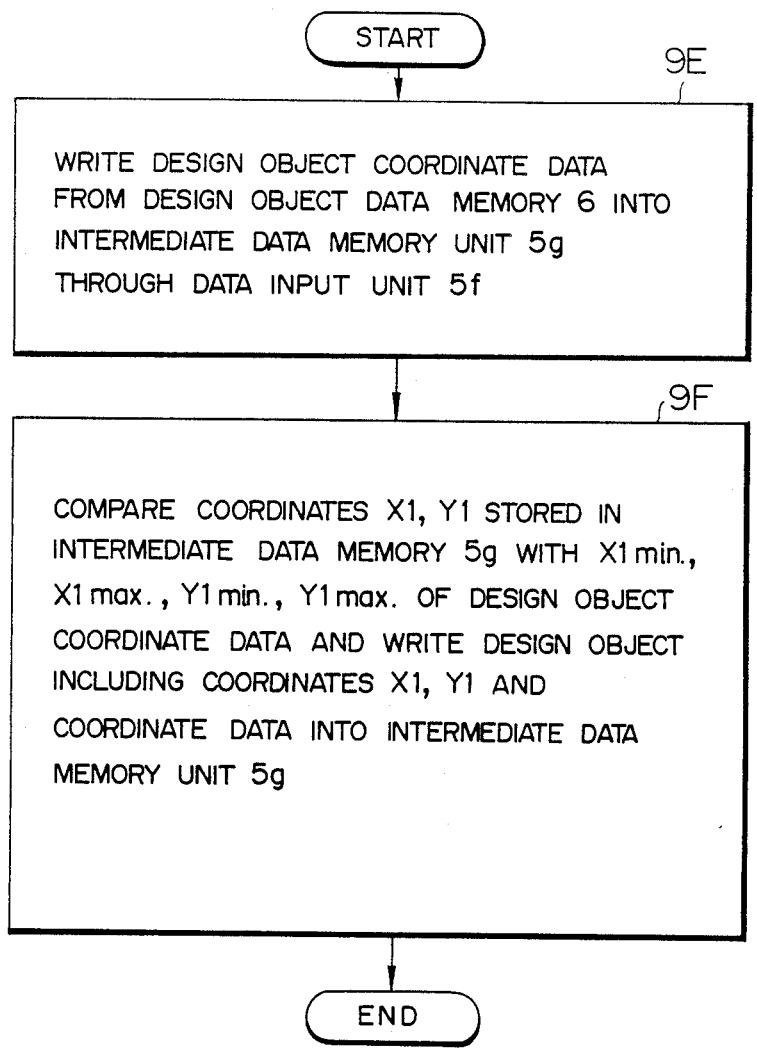

FIG. 15 shows a detail of the procedure (b) of the step 9, that is, steps 9E and 9F. In the step 9E, the design object and the coordinate data ($X_1$max, $Y_1$max, $X_1$min, $Y_1$min) of the design object corresponding to the coordinate which is in the image 24 displayed on the display device 1 and inputted in the step 9A and which is stored in the intermediate data memory unit 5g are selected from the design object data memory 6, and they are stored in the intermediate data memory unit 5g through the data input unit 5f. Then, in the step 9F, the design object whose coordinates $X_1$ and $Y_1$ which are displayed on the screen 17 and stored in the intermediate data memory unit 5g in the step 9B meet the relations (1). and (2) in which the coordinate data of the design object stored in the intermediate data memory 5g in the step 9E are placed is selected from the intermediate data memory 5g.

$$X_1 \text{min} \leq X_1 \leq X_1 \text{max} \quad (1)$$

$$Y_1 \text{min} \leq Y_1 \leq Y_1 \text{max} \quad (2)$$

where $X_1$min is a value of the item $X_1$min of the design object coordinate data of FIG. 2, $X_1$max is a value of the item $X_1$max, $Y_1$min is a value of the item $Y_1$min, and $Y_1$max is a value of the item $Y_1$max.

In the present embodiment, let us assume that the coordinates inputted in the step 9A are $X_1 = 3,000$, $Y_1 = 11,000$. From the design object coordinate data (stored in the design object data memory 6) shown in FIG. 2, the design object WL001 which has Xmin = 1,000
Xmax = 5,000
Ymin = 10,000
Ymax = 11,500 meets the conditions (1) and (2). Thus, the design object WL001 is selected. The name of the design object selected in the step 9 is temporarily stored in the intermediate data memory unit 5g.

After the processing of the step 9, processing of a step 10 is performed. The step 10 is a menu item selection step which comprises three procedures including (a) reading a coordinate of the menu item on the display screen by the input device 4, (b) changing the menu item name displayed on the display device 1 if the coordinate value read corresponds to an "update" or "return" item, and (c) reading the menu item name of the read coordinate from the design object data memory 6. Detail of the step 10 is shown in FIG. 16.

The procedure (a) of the step 10, that is, a step 10A is the same as the procedure (a) of the step 9, that is, the steps 9A-9D shown in FIG. 14, except that the coordinates $X_1$, $Y_1$ in the steps 9A, 9B and 9C are replaced by coordinates $X_2$, $Y_2$ in the step 10A. In the step 10A, the coordinates $X_2$ and $Y_2$ of the menu item which is in the image 19 FIG. 13) displayed on the display device 1 and designated by the operator through the input device 4 are entered and stored in the intermediate data memory unit 5g.

Figure 16:
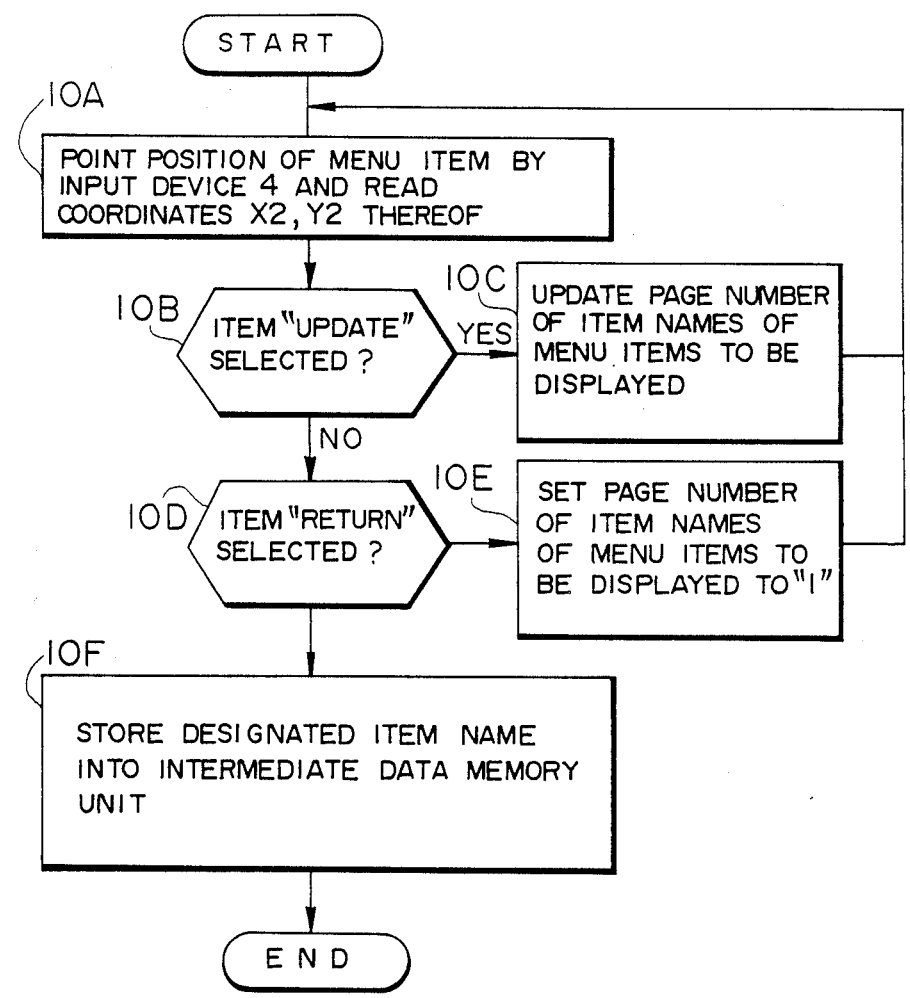
FIG. 16 shows a detailed process of a third step 10 in the process flow by the processing apparatus of FIG. 8.

The procedure (b) of the step 10 corresponds to steps 10B-10E of FIG. 16. A change of the image 19 due to the position on the screen 17 designated by the input device 4 in the steps 10A-10E is explained in connection with a simple example, with reference to FIG. 13. The image 19 is now an image 19A shown in FIG. 11. For example, a pointing position (cursor) displayed on the image 19 is moved to the menu item "minimum spacing" by the input device 4, and an interrupt signal is sent from the input device 4 to the processor 5. Thus, the menu item name "minimum spacing" is entered to the intermediate data memory unit 5g and stored therein (step 10A). However, if there is no menu item to be selected by a designer (operator) from the menu items 1 to 4 of the displayed image 19, the display content of the menu items of the image 19 is changed to menu items of the other page shown in FIG. 4. This is done by updating the page. The page updating is carried out in the following manner. A pointing position (cursor) displayed in the image 19 of the menu item is moved to the item name "update" by the input device 4 and an interrupt signal is sent from the input device 4 to the processor 5 (step 10B). Thus, the page number which designates the item name corresponding to the menu item shown in FIG. 4 is incremented by one (step 10C). For example, when the position of "update" on the image 19 shown in FIG. 13 is designated by the input device 4 and the interrupt signal is sent to the processor 5, the page number of the menu items to be displayed is updated from page 1 to page 2. As a result, the image 19 on the screen 17 changes to an image 19B shown in FIG. 12. When the page number of the menu items to be displayed is to be returned from page 2 to page 1, "return" in the image 19 is pointed to by the input device 4. Thus, the item names of the menu items on the page 1 are displayed in the image 19 in the steps 10D and 10E. In the procedure (c) of the step 10, that is, in the step 10F of FIG. 16, the item name at the position which meets the following conditions is selected based on the coordinates $X_2$ and $Y_2$ on the image 19 of the menu items stored in the intermediate data memory unit 5g in the procedure (a) of the step 10. The selected item name is the data for the object of the design reference to be made.

$$X_2 \text{min} \leq X_2 \leq X_2 \text{max} \quad (3)$$

$$Y_2\text{min} \leq Y_2 \leq Y_2\text{max} \tag{4}$$

where $X_2\text{min}$ is a value of the coordinate data $X_2\text{min}$ of the menu item, $X_2\text{max}$ is a value of the coordinate data $X_2\text{max}$, $Y_2\text{min}$ is a value of the coordinate data $Y_2\text{min}$, and $Y_2\text{max}$ is a value of the coordinate data $Y_2\text{max}$.

Figure 20:
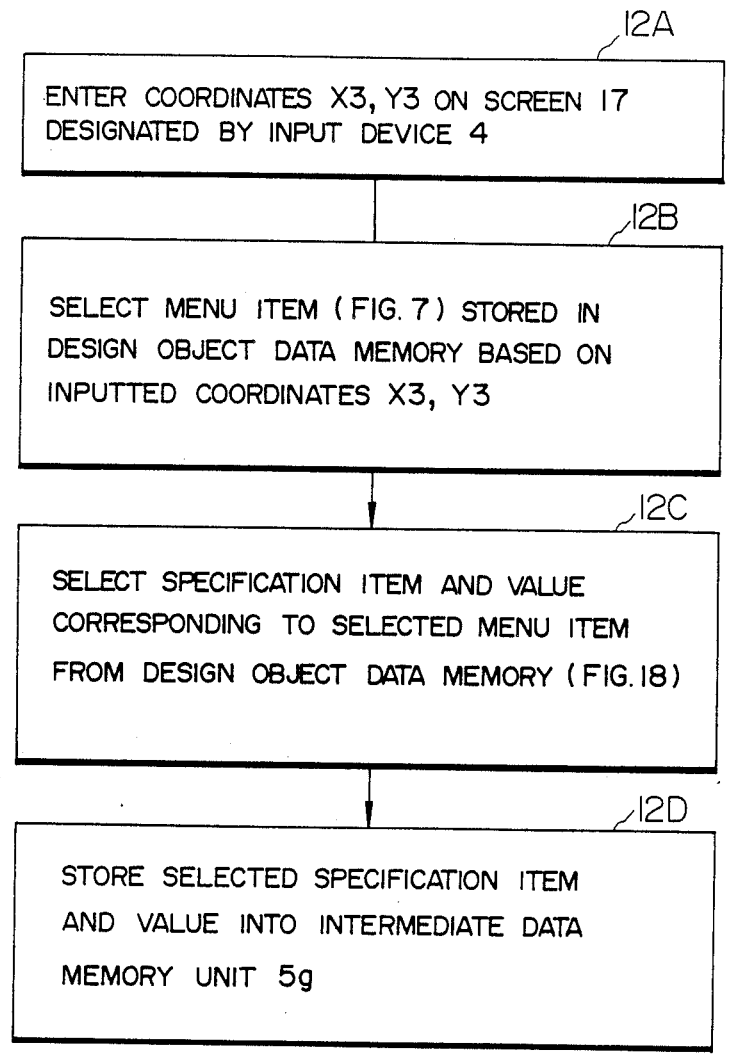
FIG. 20 shows a detailed process of a step 12 of FIG. 8.

For example, in the present embodiment, when the coordinates of the menu item inputted in the step 10A are $X_2=250$ and $Y_2=30$, the menu item "menu 1" in the menu item coordinate data (stored in the design object data memory 6) shown in FIG. 3, which has $X_2\text{min}=200$
$X_2\text{max}=300$
$Y_2\text{min}=0$
$Y_2\text{max}=50$ meets the conditions (3) and (4). The page to be selected from FIG. 4 is designated in the step 10B or 10D. For example, in the procedure (b) of the step 10, when the page 1 is selected, the item name of the menu item selected in the above procedure is "minimum spacing". This selected item name is a restrictive item for the design reference and it is temporarily stored at a predetermined address of the intermediate data memory unit 5g (FIG. 20). The process after the step 11 in accordance with the computer program is explained assuming that the menu item stored in the intermediate data memory unit 5g in the step 10F is "minimum spacing".

In the step 11, specification data of the design object stored in the design object data memory 6 is retrieved based on the design object name selected in the step 9 and temporarily stored in the intermediate data memory unit 5g, and it is displayed in a list on the screen 17 of the display device 1.

Figure 17:
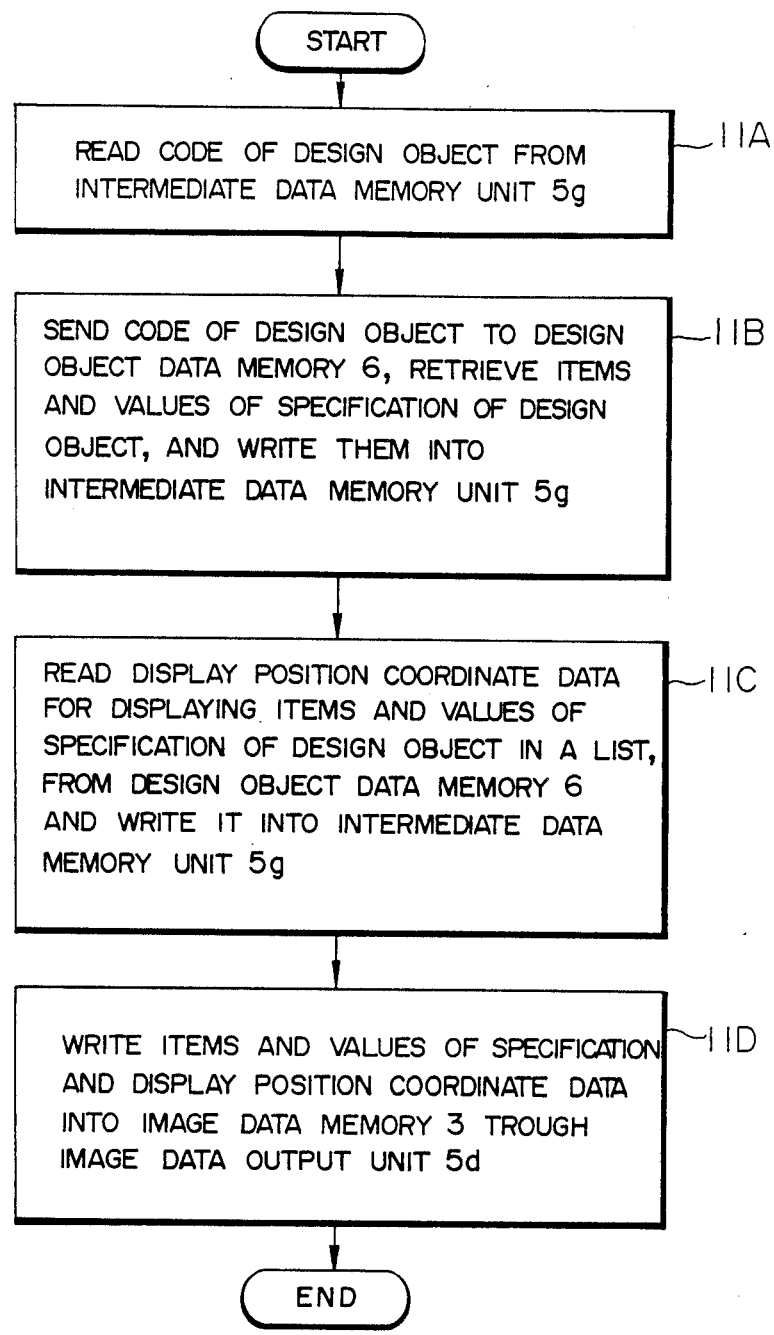
FIG. 17 shows a detailed process of a step 11 of FIG. 8.
Figure 19:
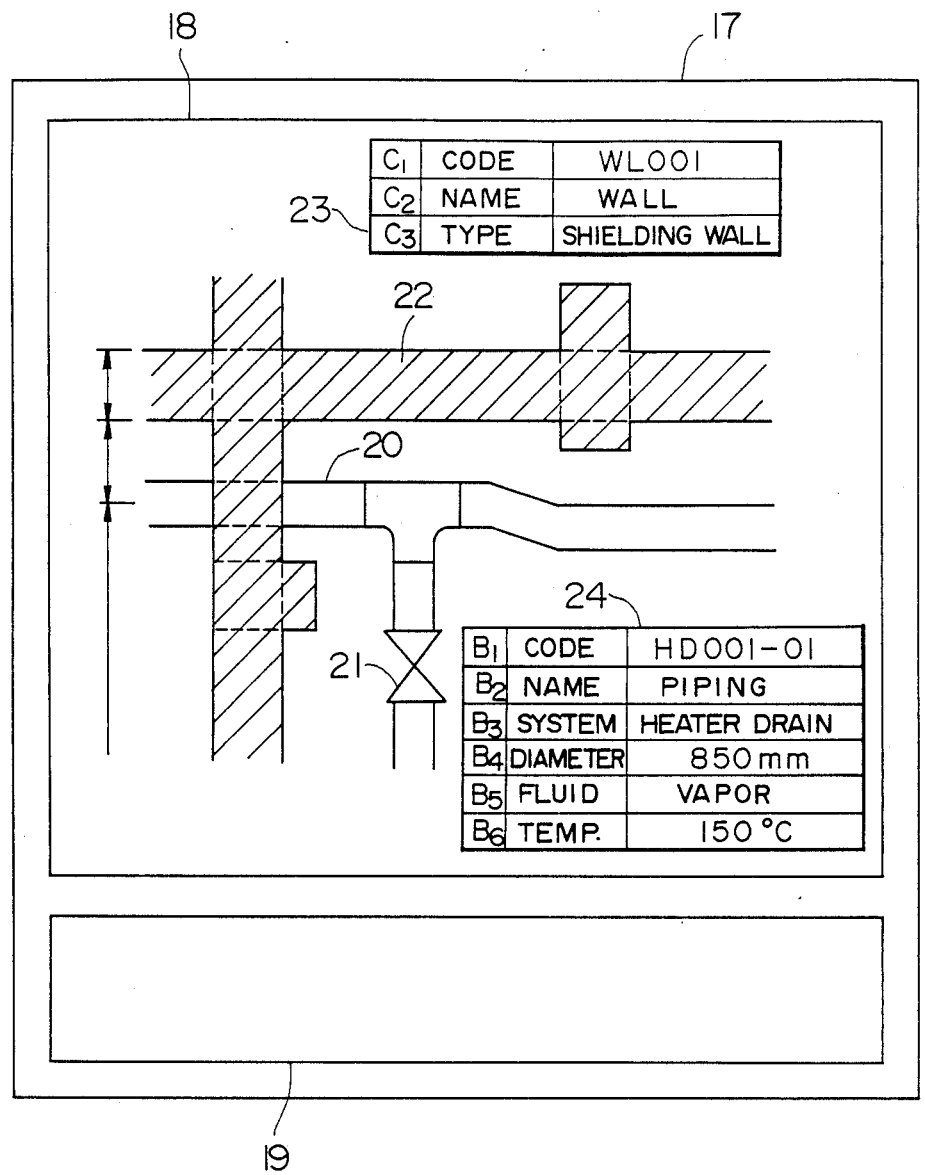
FIG. 19 shows an image of design object, specification item and specification value by the apparatus shown in FIG. 1.

FIG. 17 shows a detail of the step 11, that is steps 11A–11D. In the step 11A, the code of the design object stored in the intermediate data memory unit 5g is read. The code of the design object is sent to the design object data memory 6 through the design object data retrieval code output unit 5e and the specification data corresponding to the code of the design object is retrieved from the specification data of the design object stored in the design object data memory 6, and the retrieved specification data of the design object is temporarily stored in the intermediate data memory unit 5g (step 11B). In the step 11C, the display position coordinate data stored in the design object data memory 6 is retrieved based on the selected specification data in order to display the selected specification data of the design object in a list in superposition on the image 18 of the design object displayed on the screen 17, and the display position coordinate data is temporarily stored in the intermediate data memory unit 5g. A relationship between the specification data and the display positions is temporarily stored in the intermediate data memory unit 5g. FIG. 18 shows an example of list data which shows the relationship between the specification data and the display positions stored in the intermediate data memory unit 5g after the step 11B. In the present embodiment, the display position coordinate data of FIG. 7 shows display positions for menu items, specification items and specification values and they are used in the process of displaying the menu items, as are the coordinate data shown in FIG. 3. On the other hand, the list data showing the relationship between the specification data and the display positions shows the relationship between the display positions of the menu items and the specification items displayed adjacently and the specification values. The data shown in FIG. 18 is used to refer to the specification items and values based on the selection of the menu display area in a process to be described later. In the step 11D, the list data (FIG. 18) of the specification data of the design object stored in the intermediate data memory unit 5g is supplied to the image data memory 3. The image display controller 2 displays the list data stored in the image data memory 3 in the step 11D as well as the image of FIG. 13 on the screen 17 of the display device 1. FIG. 19 shows an example of an image displayed on the screen 17 of the display device 1 after the step 11. The list images 23 and 24 are prepared in the step 11.

In a step 12 of the present embodiment, the specification items of the design object in the image displayed on the display device 1 and the menu items in the list of the corresponding specification values are combined in accordance with the data inputted by the operator to prepare the design reference data. As the operator sequentially designates the specification items of the design object such as lists 23 and 24 displayed on the screen 17 of the display device 1 and the corresponding specification values, the data items of the design reference and the corresponding values are written into predetermined addresses of the intermediate data memory unit 5g. This is shown in FIGS. 22 to 24. FIG. 21 shows a content of the intermediate data memory unit 5g of the item names of the menu items of the design reference selected in the step 10. The operator designates the specification item of the design object on the screen 17 and the corresponding value by the input device 4 to read out the specification item and the corresponding value from the intermediate data memory unit 5g, in the following manner The step 12 comprises the following procedures (a) and (b).

(a) Retrieve a correlation table (FIG. 7) of the menu item and the coordinate stored in the design object data memory 6 based on the coordinate on the screen designated by the input device 4 to determine the menu item (steps 12A and 12B in FIG. 20).

(b) Retrieve the specification item and value corresponding to the retrieved menu item from the correlation list (FIG. 18) stored in the design object data memory 6 and store them in the intermediate data memory unit 5g (steps 12C and 12D in FIG. 20). In FIG. 20, the data item of the design reference of "minimum spacing" and basic candidates of values thereof are previously stored in the design object data memory 6, and they are temporarily stored in the intermediate data memory unit 5g. This is done before the step 12. The design reference data includes items "object - 1" and "object - 2" for designating two design objects which secure "minimum spacing" and an item "reference value" for designating a reference value of "minimum spacing" secured between the two design objects.

A procedure for limiting the specification item and value of the design object to specifically set the "reference value" of the "minimum spacing" by making the design reference data based on the limited specification item and value selected from the existing specification items and values of the design object, now will be explained. In FIG. 22, based on the menus $B_2$ and $B_3$ which are the menu items in the list 24 for the piping 20 on the screen 17 shown in FIG. 19 and designated by the operator through the input device 4, the corresponding specification items "name" and "system" and the specification values "piping" and "heater drain" are stored into the intermediate data memory unit 5g. Numeral 25 denotes an address at which the data of the condition part of the design reference is stored, and numeral 26 denotes an address at which the data of the conclusion part of the design reference is stored. The specification value "piping" is also stored in the field of code 1 of the conclusion part 26. In order to attain the status of FIG. 22, steps 12A-12D of FIG. 20 are executed. When the coordinate value on the screen 17 is inputted by the input device 4 after the step 12D, the steps 12A-12D are again repeated. The repetition continues until the inputting of the coordinate value on the screen by the input device 4 terminates. In the present embodiment, since the menu item "menu B$_4$" on the screen 17 is designated after the status of FIG. 22 has been attained, the steps 12A-12D are executed A content of the intermediate data memory unit 5g shown in FIG. 23 is obtained by selecting the menu item "menu B$_3$" in the table 24 by the input device 4 selecting the item ">reference value" with the image 19 being the image corresponding to page 3 of FIG. 4, and entering the reference value (800) for determining the "diameter" by a keyboard (not shown). While not shown in FIG. 20, the step 12 includes the steps 10A-10F of FIG. 16. After the status of FIG. 23 has been attained, the steps 12A-12D are executed and the content of the intermediate data memory unit 5g shown in FIG. 24 is obtained. By designating the menus C$_2$ and C$_3$ which are the menu items of the table 23 on the screen 17 by the input device 4, the specification items "name" and "type" and the specification values "wall" and "shielding wall" are selected from the design object data memory 6, and they are stored in predetermined areas of the condition part address 25 of the intermediate data memory unit 5g. The specification value "wall" is stored in a predetermined area of the conclusion part address 26 of the intermediate data memory unit 5g (address of the "value" corresponding to the item "code 2"). The values corresponding to the "code 1" and "code 2" of the conclusion part address 26 ("piping" and "wall" in the present embodiment) are design objects to which the design reference is applied. The design reference data prepared in the step 12 and stored in the intermediate data memory unit 5g shown in FIG. 24 represents a design reference which limits "minimum spacing between the heater drain pipe having a diameter no smaller than 800 mm and the shielding wall".

In a step 13 of the present embodiment, if the operator selects a menu item for which a design reference is to be set in the step 10, inputting of the design reference is urged on the operator and the design reference inputted y the operator is written into the intermediate data memory unit 5g as the design reference data. FIG. 25 shows details of the step 13. In a step 13A, whether the item "reference value" of the conclusion part address 26 of the intermediate data memory unit 5g has been set or not is checked. If it has not been set, the operator is urged to input the design reference. The item name of the design reference and the item name of the reference value are supplied to the image data memory 3 (step 13B). As a result, the item name of the design reference and the item name of the reference value are displayed on the screen 17 of the display device 1. Those display areas are colored or (intensified). For example, the item names "minimum spacing" and "reference value" of the design reference in the present embodiment are colored (or intensified) distinctively from the display areas of the design object and menu displayed on the screen to urge the operator to input the design reference value. In a step 13C, the reference value inputted by the operator through the input device 4 is written into the area for the item "reference value" of the conclusion part address 25. For example, when the operator inputs "1,000" as the reference value of the design reference for "minimum spacing", the stored data of the design reference in the intermediate data memory unit 5g after the step 13C is that shown in FIG. 26.

Figure 28:
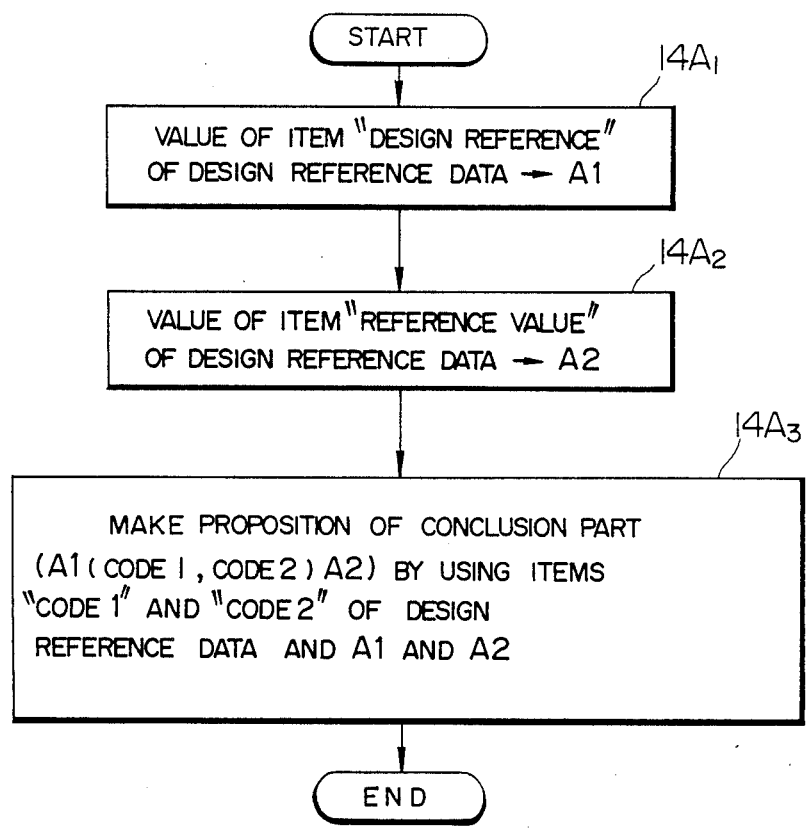
FIG. 28 shows a detailed process of a step 14A of FIG. 27.
Figure 29:
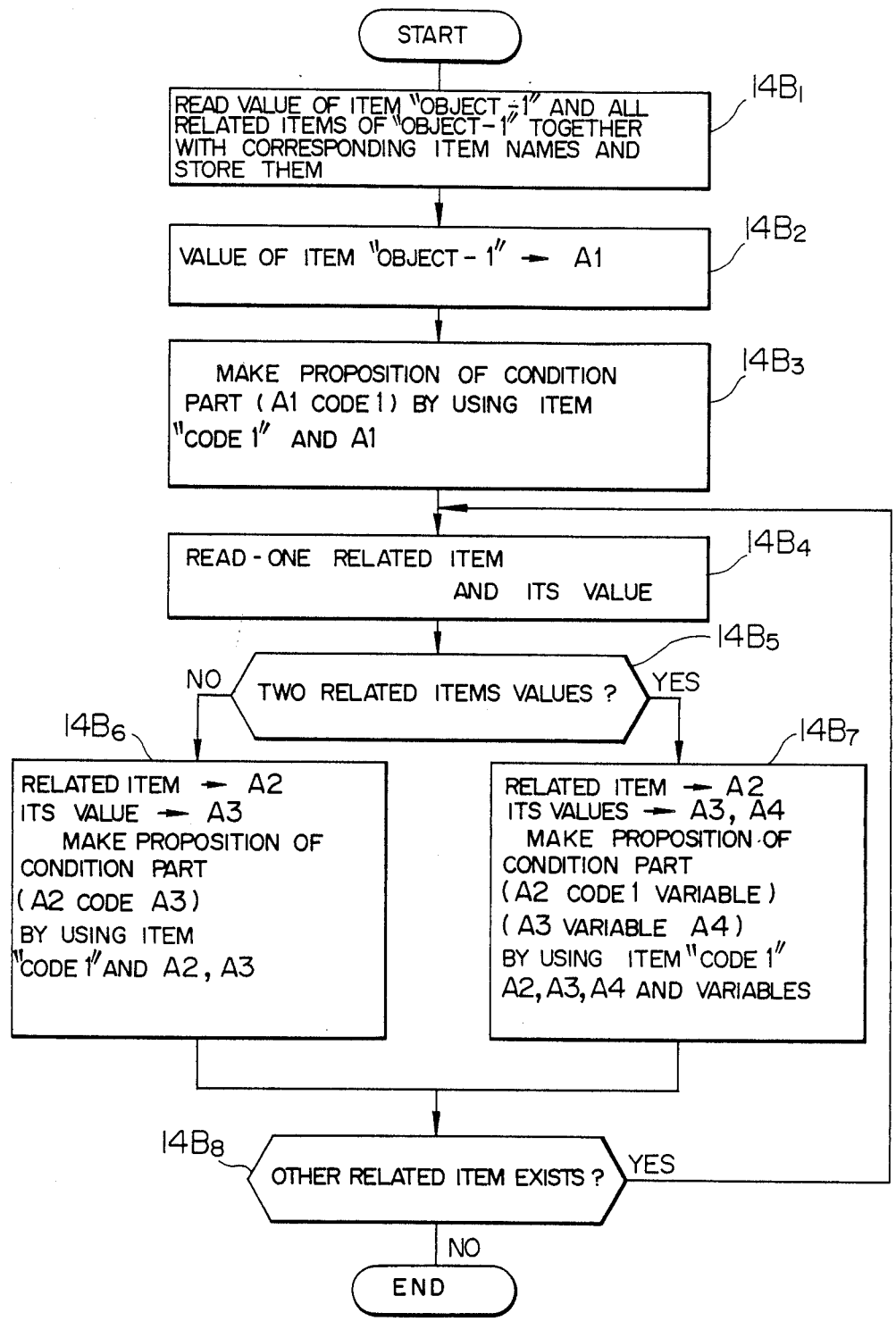
FIG. 29 shows a detailed process of a step 14B of FIG. 27.

In a step 14, the design reference data stored in the intermediate data memory unit 5g after the steps 1 to 13 is converted to a data structure comprising a condition part and a conclusion part. The step 14 uses an IF-THEN type data structure based on predicate logic as the data structure comprising the condition part and the conclusion part. FIG. 27 shows a detail of the step 14, that is, steps 14A-14C. Steps 14A$_1$-14A$_3$ shown in FIG. 28 illustrate procedure of the step 14A. In the step 14B, values corresponding to the items of the design reference data are sequentially converted to the propositions of the condition part for each object of the design reference. FIG. 29 shows details of the step 14B when the object of the design reference is the item "object - 1" (FIG. 26) of the design reference data. The step 14B has a procedure to make the propositions of the condition part to the item "object - 2" of FIG. 26, although not shown. This procedure is executed after a step 14B$_8$ of FIG. 29 with the "object - 1" of step 14B$_1$-14B$_7$ being changed to "object - 2" and "code 1" being changed to "code 2".

Figures 30, 31:
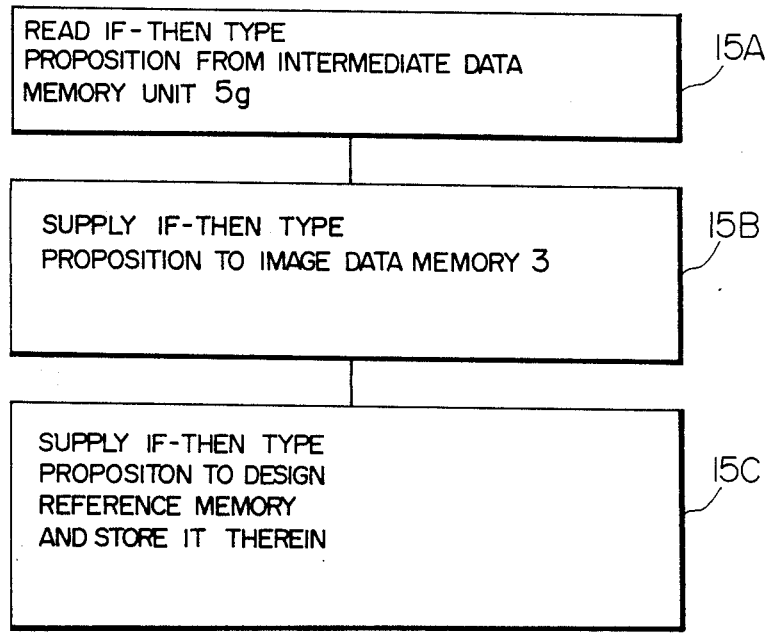
FIG. 30 shows a stored design reference obtained in the step 14.
FIG. 31 shows a detailed process of a step 15 of FIG. 8.

The steps 14A$_1$-14A$_3$ are executed by using the data stored at the conclusion part address 26 (FIG. 26) of the intermediate data memory unit 5g to make the proposition of the conclusion part shown by "THEN" in FIG. 30. When the data stored at the conclusion part address 26 of FIG. 26 is used, the codes A$_1$, A$_2$, 1 and 2 in the steps 14A$_1$-14A$_3$ are "minimum spacing", "1,000", "piping" and "wall", respectively. The codes 1 and 2 of the proposition of the conclusion part shown in FIG. 30 are "piping" and "wall", respectively.

The proposition of the condition part is then made in the step 14B. The data stored in the intermediate data memory unit 5g of FIG. 26 is used to make the proposition. In the step 14B$_1$, "system" and "diameter" which are related items of the item "object - 1", "heater drain" which is the value of the related item "system", and ">reference value" and "800" which are values of the related item "diameter" are read and stored at other addresses of the intermediate data memory unit 5g. In the step 14B$_2$, "piping" corresponds to code A$_1$. In the step 14B$_4$ after the step 14B$_3$, the related item, for example, "system" is read from the intermediate data memory unit 5g into the processing unit 5a. In the present embodiment, the decision in the step 14B$_5$ is "NO" and the step 14B$_6$ is executed. The code A$_2$ is "system" and the code A$_3$ is "heater drain". The decision in the step 14B$_8$ is YES because of the related item "diameter". In the step 14B$_4$, "diameter" is read. The decision in the step 14B$_5$ is YES and the step 14B$_7$ is executed In the step 14B$_7$, the code A$_2$ is "diameter", the code A$_3$ is ">reference value" and the code A$_4$ is "800". The decision in the step 14B$_8$ is NO and the process for the "object - 2" is carried out in accordance with the procedure described above. After the step 14B, the proposition of the condition part shown by "IF" in FIG. 30 is made. In the step 14C, the IF-THEN type proposition (FIG. 30) which comprises the proposition of the condition part and the proposition of the conclusion part are stored in the intermediate data memory unit 5g.

Finally, the step 15C is executed The step 15 comprises steps 15A-15C as shown in FIG. 31. The IF- THEN type proposition stored in the step 14C is read from the intermediate data memory unit 5g (step 15A). The IF-THEN type proposition is then supplied to the image data memory 3 through the image data output unit 5d and stored into the image data memory 3 (step 15B). The IF-THEN type proposition shown in FIG. 30 is displayed on the display device 1 by the image display controller 2. In the step 15C, the IF-THEN type proposition read in the step 15A is supplied to and stored into the design reference memory 7 through the design reference output unit 5h.

The IF-THEN type proposition (design reference) stored in the design reference memory 7 is used for layout design of a plant by a CAD apparatus. For example, by docking the design reference making apparatus of the present embodiment with a design support apparatus shown in Japanese Patent Application No. 60-53764 (U.S patent Ser. No. 838,957) (or by adding a program shown in FIG. 7 of the Japanese Patent Application No. 60-53764 to the computer program stored in the process memory unit 5h of the processor 5 of the present embodiment), the plant layout and the making of the design reference can be accomplished by one apparatus.

In accordance with the present embodiment, any design drawing can be displayed on the display apparatus 1 and the design object which is the object of the design reference can be designated while the operator watches the image. Since the restrictive item of the design reference can be readily selected, high precision (error-free) design reference can be made and the operation time can be significantly reduced. Since the specification data of the design object can be displayed on the display apparatus 1, necessary items can be correctly selected and high precision design references can be made.

What is claimed is:

1. A method for use in a design support apparatus which includes input means; a display device; a memory device; and a data processor, connected to said input means, said display device and said memory device, for generating a design reference, comprising the steps performed in said processor of:

displaying graphics of a plurality of designated design objects on said display device;

selecting a particular design object from the design objects displayed on said display device by using a selection signal from said input means;

displaying specification data selected from said memory device by using the selected design object;

displaying menus of restrictive items to be applied in designing the selected design object and said restrictive items being selected from said memory device by using the selected design object, said restrictive items being parameters of said selected design object;

selecting particular specification data from the specification data displayed on said display device by using a selection signal from said input means;

selecting a particular restrictive item from the restrictive items menus displayed on said display device by using a selection signal from said input means;

setting a reference value corresponding to said selected restrictive item by using data from said input means; and creating a design reference of the selected design object consisting of condition and conclusion parts using said selected specification data, said selected restrictive item and said reference value.

2. A method for generating a design reference according to claim 1, wherein said selecting step includes the steps of displaying a plurality of restrictive items on said display device and selecting the restrictive item applied to said selected design object from said plurality of displayed restrictive items in response to a selection signal from said input means.

3. A method for generating a design reference according to claim 1 further comprising the steps performed by said data processor of creating a condition part of said design reference in accordance with said selected design object and said selected specification data, and creating a conclusion part of said design reference in accordance with said selected design object, said restrictive item and said reference value.

4. A method for generating a design reference according to claim 3, wherein said selected specification data is displayed on said display device.

5. A method for generating a design reference according to claim 3, wherein said design reference is displayed on said display device.

6. A method for generating a design reference according to claim 3, wherein said design reference is stored in said memory device.

7. A method for generating a design reference according to claim 1, wherein said design reference is displayed on said display device.

8. A method for generating a design reference according to claim 1, wherein said design reference is stored in said memory device.

9. A design reference generating apparatus comprising:

an input device;

a display device;

first memory means for storing data of design objects;

second memory means for storing a procedure for supplying to said display device graphic information of design objects designated by said input device for display of said graphic information on said display device, selecting specification data from said memory device by using a redesignated design object for display of said specification data on said display device, selecting restrictive items from said memory device using said redesignated design object for display of said restrictive items as a plurality of menus of restrictive items on said display device, said restrictive items being parameters of said redesignated design object, selecting particular specification data by using a selection signal from said input means, selecting a particular restriction item using a selection signal from said input means, and setting a reference value corresponding to said selected particular restrictive item; and processing means for outputting graphic information of said redesignated design object based on said procedure stored in said second memory means and for creating said design reference consisting of condition and conclusion parts;

said display means displaying the graphic information of said redesignated design object and said design reference.

10. A design reference making apparatus according to claim 9 wherein said second memory means further stores a procedure for supplying graphic information of the designated design object to said display device, supplying the restrictive items selected from said first memory means to said display means, and for replacing the designated design object with the redesignated design object based on the restrictive item displayed on said display means and designated by said input device, the redesignated design object and the reference value, and said processing means produces the graphic information of the design objects and the selected restrictive items and creates the design reference consisting of said condition and conclusion parts.

11. A design reference making apparatus according to claim 9 wherein
said second memory means further stores a procedure for supplying graphic information of designated design objects to said display device, conclusion part of the design reference being created based on the redesignated design object, the selected restrictive item and the reference value; and said processing means outputs graphic information of the design objects in accordance with said procedure.

12. A design reference generating apparatus comprising:
an input device;
a display device;
first memory means for storing data of design objects;
second memory means for storing design references;
third memory means for storing a procedure for supplying graphic information of design objects designated by said input device to said display device for display, selecting specification data from said memory device by using a redesignated design object for display of said specification data on said display device, selecting restrictive items from said memory device using said redesignated design object for display of said restrictive items as a plurality of menus of restrictive items on said display device, said restrictive items being parameters of said redesignated design object, selecting particular specification data by using a selection signal from said input means, selecting a particular restriction item using a selection signal from said input means, and setting a reference value corresponding to said selected particular restrictive item, for creating a design reference of the redesignated design object consisting of condition and conclusion parts according to the redesignated design object, the selected restrictive items and said reference value inputted by said input device, and for storing the created design reference into said second memory means; and
processing means for outputting graphic information of the design reference in accordance with said procedure, creating the design reference consisting of condition and conclusion parts and for storing the design reference into said third memory means;
said display means displaying the graphic information of the design objects and the design reference.

13. A design reference making apparatus according to claim 12, wherein:
said third memory means further stores a procedure for supplying graphic information of the designated design object to said display device;
said condition part of the design reference being created based on the redesignated design object and the selected specification data;
said conclusion part of the design reference being created based on the redesignated design object, the selected restrictive item and the reference value;
wherein said design reference consisting of the condition part and the conclusion part is stored into said second memory means.

14. A design reference generating apparatus comprising:
an input device;
a display device;
memory means for storing data of a design object;
means for supplying graphic information of design objects designated by said input device and read from said memory means to said display device for display of said graphic information on said display device, for selecting a particular design object from the design objects displayed on said display device in response to a selection signal from said input device, selecting specification data from said memory device by using a redesignated design object for display of said specification data on said display device, selecting restrictive items from said memory device using said redesignated design object for display of said restrictive items as a plurality of menus of restrictive items on said display device, said restrictive items being parameters of said redesignated design object, selecting particular specification data by using a selection signal from said input means, selecting a particular restriction item using a selection signal from said input means, and setting a reference value corresponding to said selected particular restrictive item, and for creating a design reference with the selected design object, said restrictive item and a reference value inputted by said input device.

15. A design reference generating apparatus according to claim 14, wherein said processing means includes means for supplying to said display device the restrictive item from said memory means and for generating said design reference with said selected design object, said restrictive item displayed on said display device and designated by said input device and said reference value.

16. A design reference generating apparatus according to claim 14, wherein said processing means includes means for generating said design reference consisting of a condition part with said selected design object and said selected specification data and a conclusion part with said selected design object, said restrictive item and said reference value.

17. A design reference generating apparatus comprising:
an input device;
a display device;
memory means for storing a design object and design references;
means for supplying graphic information of design objects designated by said input device and read from said memory means to said display device for display, for selecting a particular design object from the design objects displayed on said display device in response to a selection signal from said input device, selecting specification data from said memory device by using a redesignated design object for display of said specification data on said display device, selecting restrictive items from said memory device using said redesignated design object for display of said restrictive items as a plurality of menus of restrictive items on said display device, said restrictive items being parameters of said redesignated design object, selecting particular specification data by using a selection signal from said input means, selecting a particular restriction item using a selection signal from said input means, and setting a reference value corresponding to said selected particular restrictive item, for creating a design reference with the selected design object, said restrictive item and a reference value to said restrictive item and said reference value inputted by said input device, and for storing the generated design reference into said memory means.

18. A design reference generating apparatus according to claim 17, wherein said processing means includes means for creating said design reference consisting of a condition part with said selected design object and said selected specification data and a conclusion part with said selected design object, said restrictive item and said reference value.

* * * * *